US012257600B2

(12) United States Patent
Zemaitis et al.

(10) Patent No.: US 12,257,600 B2
(45) Date of Patent: Mar. 25, 2025

(54) ALUMINUM SURFACE TREATMENT METHOD TO INCREASE ADHESION WITH POLYURETHANE COATING

(71) Applicant: Femtika, UAB, Vilnius (LT)

(72) Inventors: Arnas Zemaitis, Vilnius (LT); Deividas Cereska, Vilnius (LT); Gabrielius Kontenis, Vilnius (LT)

(73) Assignee: Femtika, UAB, Vilnius (LT)

( * ) Notice: Subject to any disclaimer, the term of this patent is extended or adjusted under 35 U.S.C. 154(b) by 825 days.

(21) Appl. No.: 17/504,548

(22) Filed: Oct. 19, 2021

(65) Prior Publication Data

US 2023/0121045 A1    Apr. 20, 2023

(51) Int. Cl.
| | |
|---|---|
| B23K 26/352 | (2014.01) |
| B05D 3/06 | (2006.01) |
| B23K 26/00 | (2014.01) |
| B23K 26/0622 | (2014.01) |
| B23K 26/60 | (2014.01) |
| B23K 103/10 | (2006.01) |

(52) U.S. Cl.
CPC ............ B05D 3/06 (2013.01); B23K 26/0006 (2013.01); B23K 26/0622 (2015.10); B23K 26/355 (2018.08); B23K 26/60 (2015.10); B05D 2202/25 (2013.01); B05D 2503/00 (2013.01); B23K 2103/10 (2018.08)

(58) Field of Classification Search
CPC .. B05D 3/06; B05D 2202/25; B05D 2503/00; B23K 26/0622; B23K 26/60; B23K 26/355; B23K 26/0006

USPC ................................................. 219/121.85
See application file for complete search history.

(56) References Cited

U.S. PATENT DOCUMENTS

| | | | | | |
|---|---|---|---|---|---|
| 5,194,723 | A | * | 3/1993 | Cates ................. | G01N 29/2418 |
| | | | | | 219/121.62 |
| 5,329,090 | A | * | 7/1994 | Woelki ................ | B23K 26/082 |
| | | | | | 219/121.68 |
| 5,782,253 | A | * | 7/1998 | Cates .................... | B24C 1/003 |
| | | | | | 134/201 |

(Continued)

OTHER PUBLICATIONS

MatWeb, Aluminum [serialonline], [retrieved on Oct. 11, 2024]. Retrieved from the Internet <URL: https://www.matweb.com/search/datasheet.aspx?bassnum=AMEAL00&ckck=1> (Year: 2024).*

(Continued)

*Primary Examiner* — Jimmy Chou
(74) *Attorney, Agent, or Firm* — Koivula & Somersalo, LLC

(57) ABSTRACT

A method for improvement of adhesion and distribution along the surface of coatings using a femtosecond laser is described. The process starts from chemical preparation or cleaning of the target material, surface predetermination, laser irradiation of the surface until a certain surface geometry is obtained, which gives the surface improved wetting properties and chemical surface activation which results in improved adhesion of the coatings on the target material surface. The surface geometries and dimensions to be obtained during irradiation are selected according to the properties of the coating and target material, including the laser parameters and/or the environment to obtain the desired surface geometry, considering possible geometry errors without compromising essential adhesion.

11 Claims, 10 Drawing Sheets

(56) References Cited

U.S. PATENT DOCUMENTS

| | | | | |
|---|---|---|---|---|
| 5,986,234 | A * | 11/1999 | Matthews | B23K 26/1476 219/121.68 |
| 6,248,974 | B1 * | 6/2001 | Wai | A63B 45/00 219/121.72 |
| 6,347,976 | B1 * | 2/2002 | Lawton | B44D 3/16 451/6 |
| 2002/0017511 | A1 * | 2/2002 | Kling | B23K 26/0619 347/47 |
| 2003/0151053 | A1 * | 8/2003 | Sun | H01S 3/0057 257/E23.15 |
| 2006/0063264 | A1 * | 3/2006 | Turner | G02B 6/13 506/39 |
| 2008/0124486 | A1 * | 5/2008 | Sawada | C23C 16/0263 427/554 |
| 2012/0328905 | A1 | 12/2012 | Guo et al. | |
| 2015/0038313 | A1 * | 2/2015 | Hosseini | B23K 26/082 219/121.75 |
| 2015/0165277 | A1 * | 6/2015 | Ono | B23K 26/083 219/121.78 |
| 2016/0001402 | A1 * | 1/2016 | Martinsen | G02B 26/105 219/121.68 |
| 2016/0199935 | A1 * | 7/2016 | Chen | G01J 3/12 219/121.61 |
| 2017/0341812 | A1 * | 11/2017 | DeMartino | B23K 26/0622 |
| 2019/0144325 | A1 * | 5/2019 | Bowden | C03B 33/04 219/121.69 |
| 2023/0121045 | A1 * | 4/2023 | Zemaitis | B05D 3/06 219/121.85 |

OTHER PUBLICATIONS

Heat Capacities for Some Select Substances [serialonline], [retrieved on Oct. 11, 2024]. Retrieved from the Internet <URL: https://gchem.cm.utexas.edu/data/section2.php?target=heat-capacities.php> (Year: 2024).*

Safety Data Sheet Polyurethane Resin UR5041B [serialonline], [retrieved on Jul. 9, 2011]. Retrieved from the Internet <URL: https://www.ulbrich.cz/chemical-technical-products/MSDS_ELECTROLUBE_UR_5041B_eng.pdf> (Year: 2010).*

MatWeb, polyurethane [serialonline], [retrieved on Oct. 11, 2024]. Retrieved from the Internet <URL: https://www.matweb.com/search/DataSheet.aspx?MatGUID=91d44cae736e4b36bcba94720654eeae> (Year: 2024).*

Polyurethane Foams [serialonline], [retrieved on Jul. 2, 2017]. Retrieved from the Internet <URL: https://www.ncbi.nlm.nih.gov/pmc/articles/PMC6152006/> (Year: 2017).*

* cited by examiner

ALUMINUM SURFACE TREATMENT METHOD TO INCREASE ADHESION WITH POLYURETHANE COATING

TECHNICAL FIELD

The present invention is related to processes and methods leading to increased adhesion of coatings on material surfaces, specifically for aluminum with polyurethane coating, via surface modification associated with surface micro- and nano-structuring and chemical activation.

BACKGROUND OF THE INVENTION

Surface adhesion can be increased mechanically or chemically, including abrasion and etching. These methods increase surface adhesion by increasing surface area including bonding area, acting as a capillary system, and by activating a material surface for chemical bonding. However, standard methods have deficiencies such as damaging the treated surface, controllability problems, being time-consuming, usage of hazardous chemicals, high-energy consumption, and being costly. As a result, these methods result in fractured materials and uneven surface topography leading to inefficient and uneven surface adhesion.

Unevenly treated surface leads to uneven adhesion properties of the target material surface with paints and other coatings, this would result in partial adhesion between the target material and paints or coatings. Furthermore, some methods damage the surface, resulting in changes of the physical and chemical properties of the target material.

To solve the identified problems, a femtosecond laser is used to improve adhesion without damaging the target material. Also, a laser system has multiple parameters that can be adjusted according to the target material's physical and chemical properties. This allows precisely modified surface topography by irradiation with light. Previous solutions in the field have used a femtosecond laser system for surface modification of the target material to increase adhesion with solid films, such as diamond-like carbon (DLC). In these processes, the target material is exposed to laser light radiation. Other solutions in the field have used a femtosecond laser to form a target material surface, resulting in a superwicking and/or superwetting (superhydrophilic) surface by exposing target material to a laser light and forming a micro-rough surface.

However, to achieve the best adhesion results between the target material and a variety of coatings, it is important to account for the physical and chemical properties of the target material and coating material and to adjust laser system parameters and environmental conditions to form selected textures on the target material surface to achieve the best adhesive properties to coatings. It is also important to prepare the target material surface before exposure to laser light by removing foreign matter from the target material itself. This ensures more even adhesion properties across the surface after exposure to laser light, which would lead to the formation of residual compounds or other issues during processing.

SUMMARY OF INVENTION

The present invention is a method for irradiating material using femtosecond duration laser pulses to increase coating adhesion to a material surface. This method leads to the formation of micro- and nano-structured topography by ablating the surface with light as well as chemical surface activation by formation of plasma plumes on the surface. This method is advantageous over other methods because multiple laser parameters are configured for the target material surface. The fine-tuning procedures used herein result in more controllable, precise results and induces more even adhesion across the material surface. Additionally, the method does not require the use of hazardous chemicals.

The present disclosure contains drawings and methodology, including required laser parameters of femtosecond laser system for laser irradiation of an exemplary material surface leading to increased adhesion with a coating material, as well as more specified parameters for the desired application.

DETAILED DESCRIPTION OF THE INVENTION

The present invention is further described herein, including references to the drawings.

The most preferred embodiment contains step for determining ideal laser parameters for a target material, however a person skilled in the art would understand that the parameters could be adjusted for other target materials.

Figure 1:
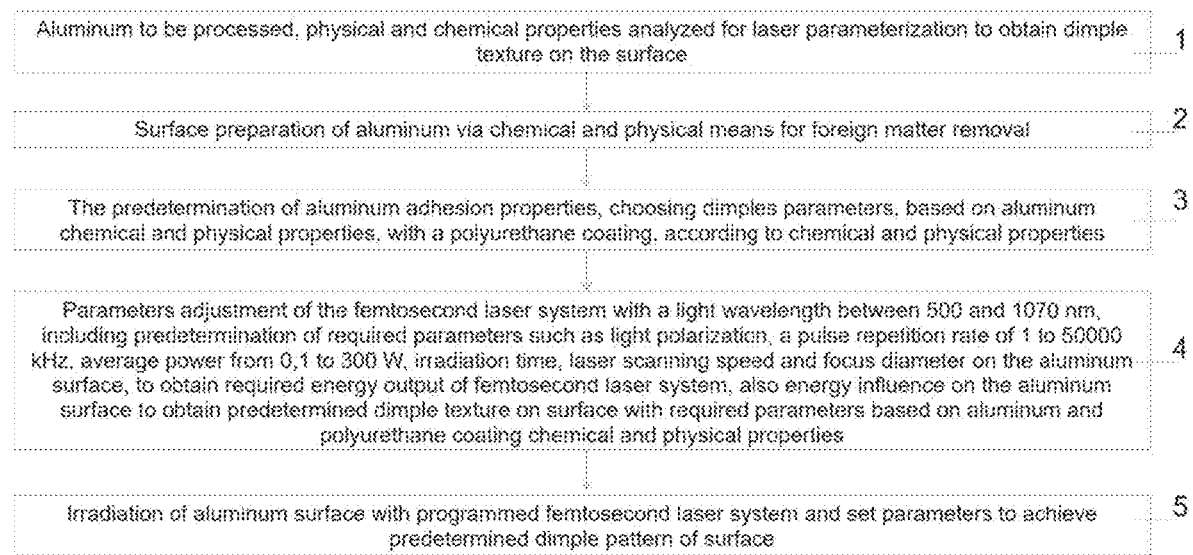
FIG. 1 shows the general invention process steps.

At step 1 of the FIG. 1, the physical and chemical properties of an aluminum material are analyzed, which is required for laser parameterization to obtain selected dimple texture on the aluminum surface. A generalized methodology of analysis is followed by an example of analysis and fabrication of an aluminum 7050 T7451 surface. Physical properties, such as surface roughness, are measured and analyzed with a profilometer, while melting and boiling points, thermal capacity, and thermal conduction are provided by material manufacture or material catalogues. Chemical properties such as chemical stability, oxidation levels, chemical composition, and reactivity with other chemicals are provided by manufactures or are found in material catalogues. For example, materials with lower melting and boiling points require lower laser power output for successful surface ablation. Surface roughness is important for fabricated texture pattern, surface roughness of the final product, and quality of texture itself. Thermal capacity and conductivity are important for predicting thermal effects leading to varied texture quality. Chemical composition and oxidation levels of surface atoms may lead to oxide formation during and after surface fabrication. Reactivity with other chemicals and chemical stability is important for surface preparation by cleaning the surface from foreign matter. Chemical stability is also important for determining the most suitable environment during fabrication, wherein the environment can be in ambient conditions, vacuum, or specific gas or liquid environment. For example, in gaseous environments, dimple formation often takes on "V"-shaped trenches while in liquid environments, the trench shape is "U"-shaped. The chemical stability of the material surface and tendency to form surface oxides under known conditions can result in surface hardening, thus for a desired dimple formation, the environmental conditions or laser parameters can be adjusted.

In step 2, the aluminum 7050 T7451 surface is prepared by cleaning the surface of foreign matter. Cleaning of aluminum 7050 T7451 surface is performed by placing the sample into an ultrasonic isopropanol bath for 10 minutes at room temperature. During this process, oil and most of the other residues are cleaned from the surface, or at least the amount is reduced. Residues on the surface would result in the formation of a chemical by-product during the laser irradiation process on the aluminum 7050 T7451 surface. After cleaning aluminum 7050 T7451 is taken out from the isopropanol bath to dry off. The cleaning procedure and cleaning media are adapted according to the material chemical reactivity and stability.

Figure 3:
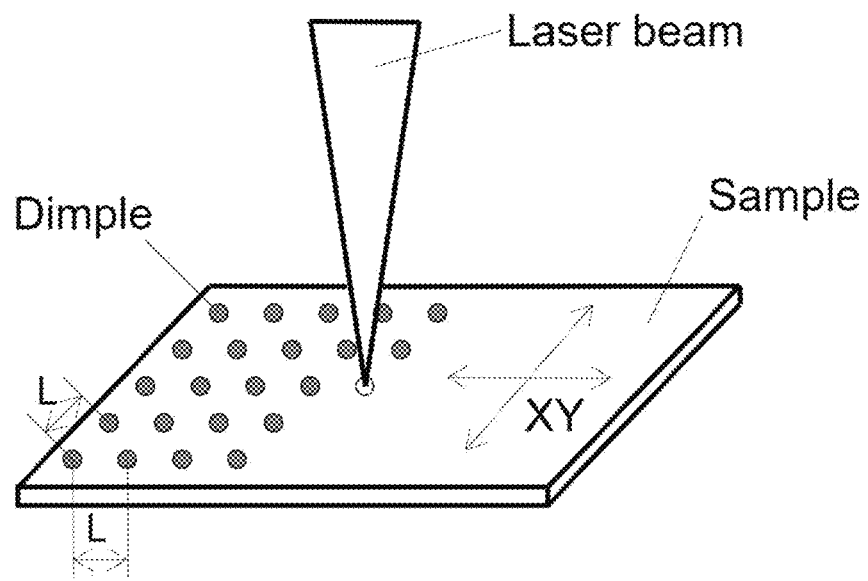
FIG. 3 shows dimples rasterization configurations on a sample surface.

At step 3, surface adhesion properties of aluminum 7050 T7451 are determined, then the dimple texture pattern is selected and parameters to achieve increased adhesion with a coating material such as polyurethane coating according to its physical and chemical properties are selected. Predetermining dimple texture includes selecting an arrangement of dimples, the distance between dimples (L=50 μm), as it is shown in FIG. 3. Diameter and depth depend on the adjustment of laser parameters.

At step 4, femtosecond laser systems parameters, with 1030 nm light wavelength, are adjusted for laser irradiation of aluminum 7050 T7451 surface for dimple texture formation. Required laser parameters are adjusted to obtain the predetermined dimple texture, such as linear polarization, pulse duration of 800 fs, pulse repetition rate at 50 kHz, average power to 2 W, irradiation time 5 ms, scanning speed 0.5 m/s, laser focus diameter 35±5 μm. The above parameters are provided for the example of aluminum 7050 T7451 surface, but the parameters can be adjusted for different materials and/or for a specific dimple or surface texture fabrication.

Figure 2:
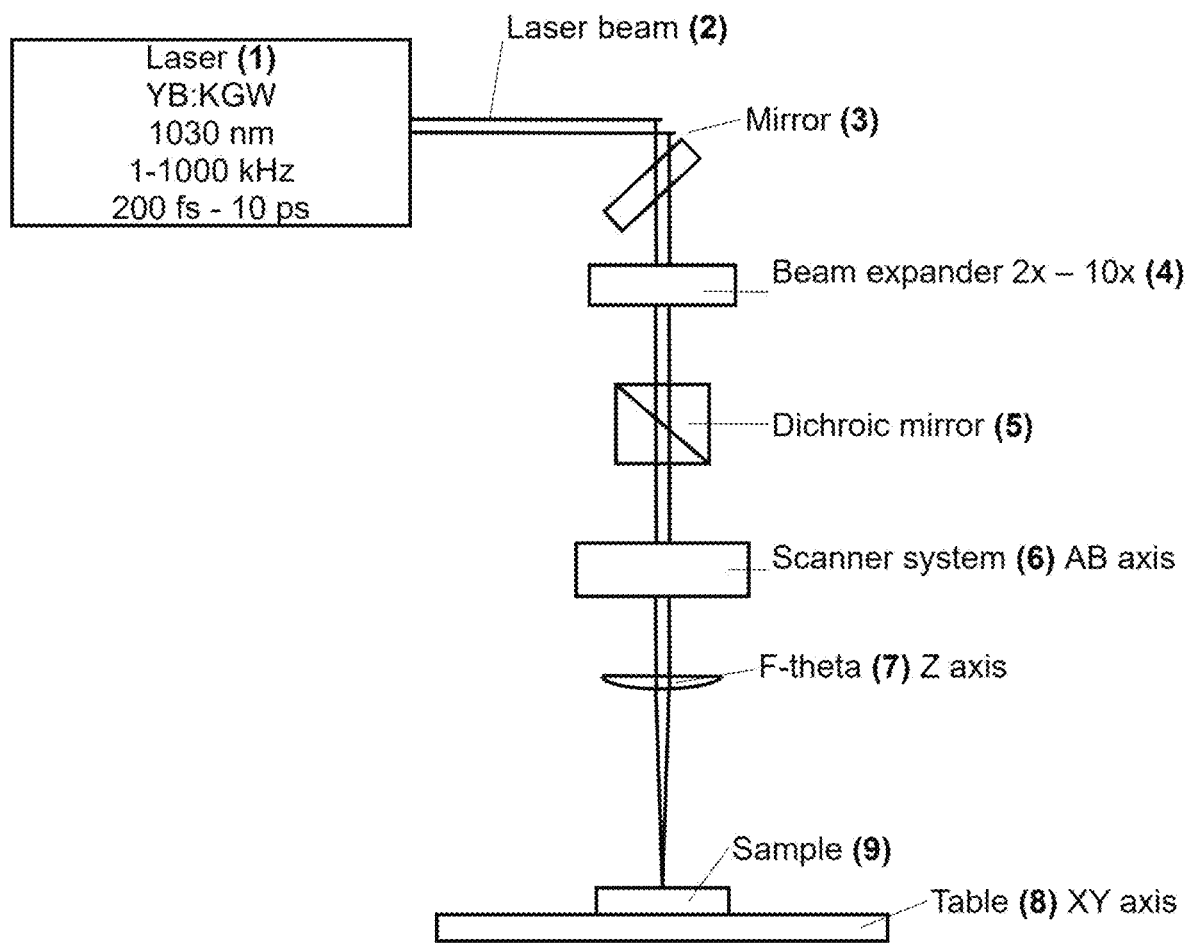
FIG. 2 shows femtosecond laser system with included systems parts.

At step 5, laser irradiation of aluminum 7050 T7451 surface is performed. The full process is shown in FIG. 2 and FIG. 3. FIG. 2 shows a laser system with components, the output of the laser (1) travels to the mirror (3) which reflects light to the beam expander (4) which expands the laser beam (2). The expanded laser beam is reflected from a dichroic mirror (5) to a scanner system (6) which regulates beam direction along the AB axis, similar to the XY axis. Further, the expanded laser beam reaches an F-theta (7) lens or any other suitable lens, where it will be focused on the sample (9) surface, in this case aluminum 7050 T7451. By regulating the Z-axis, the laser beam focus point is adjusted to match the surface of the material; focus point diameter is adjusted by the beam expander. Aluminum 7050 T7451 sample (9) is fixed on a table (8) that moves in the XY plane. FIG. 3 shows dimple (3) formation on a aluminum 7050 T7451 sample.

In a preferred embodiment, the whole process is executed in a controllable environment in ambient atmosphere. The focused laser beam (1) interacts with the aluminum 7050 T7451 surface, in the focus point area, the material surface (2) adsorbs light energy and overheats, leading to surface evaporation and plasma plume formation. Layer by layer material is evaporating at the focus point area leading to a formation of dimples. During this process, the laser shutter is open for 5 ms then closed, forming specific depth dimple, then the table moves aluminum 7050 T7451 in X or/and Y direction to another laser focus area, then opens the shutter for 5 ms and closes again. The process is repeated until the surface is textured with dimples in a predetermined pattern. Then the textured aluminum 7050 T7451 surface is ready for coating with MIL-PRF-85285 polyurethane coating. Other types of polyurethane coatings could be used or could be used with other types of coatings.

Figure 7:
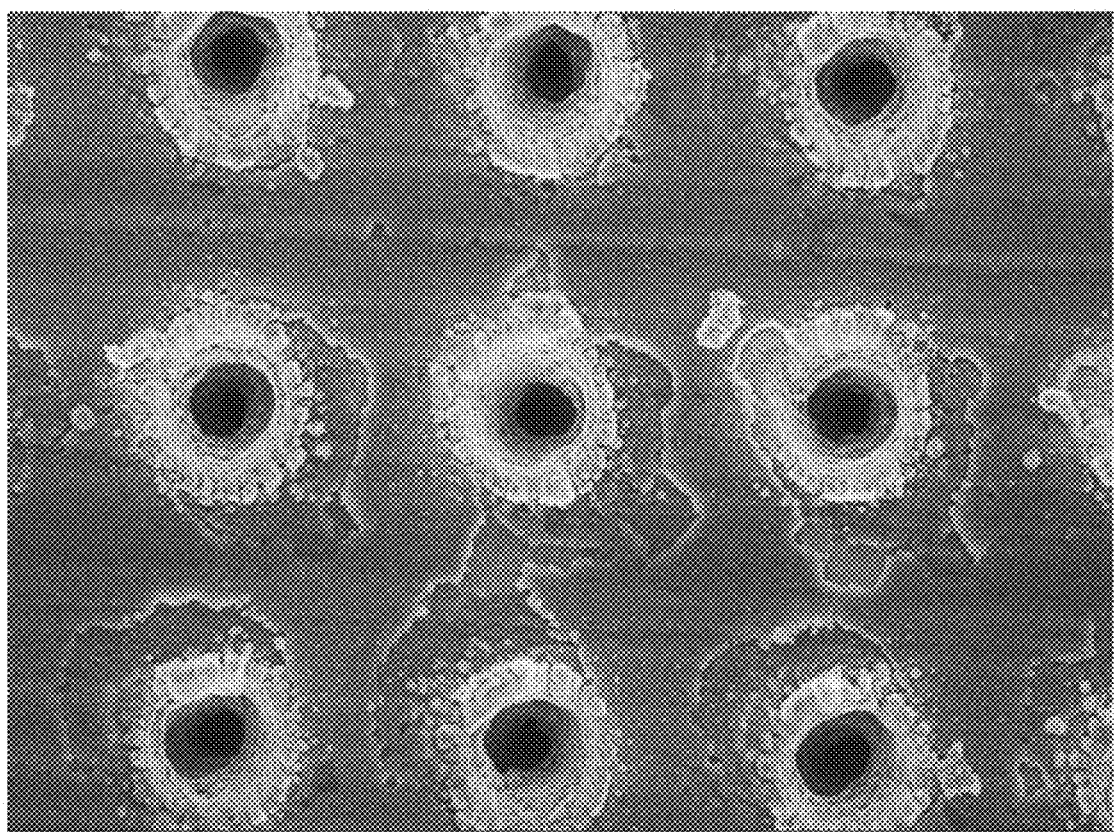
FIG. 7 shows examples of formed dimples texture on surface.

Another exemplary embodiment uses the steps of preparing of target material for laser irradiation, predetermining laser parameters, polarization type, pulse repetition rate, average power, irradiation time, scanning speed, laser focus diameter of femtosecond system according to target material chemical and physical properties and coating material chemical and physical properties to form dimples on target material surface before coating the dimpled surface. The process is executed by irradiating the target material surface, opening the shutter for a predetermined amount of time then closing the shutter, moving the target material in the X or, and Y-axis within a predetermined distance, to adjust the focus point to a different area of a target material and again opening the shutter for a predetermined amount of time before closing the shutter. The process is repeated until the target surface is textured with dimples in a predetermined pattern. Example of dimple patterns are shown in FIG. 7.

Figure 4:
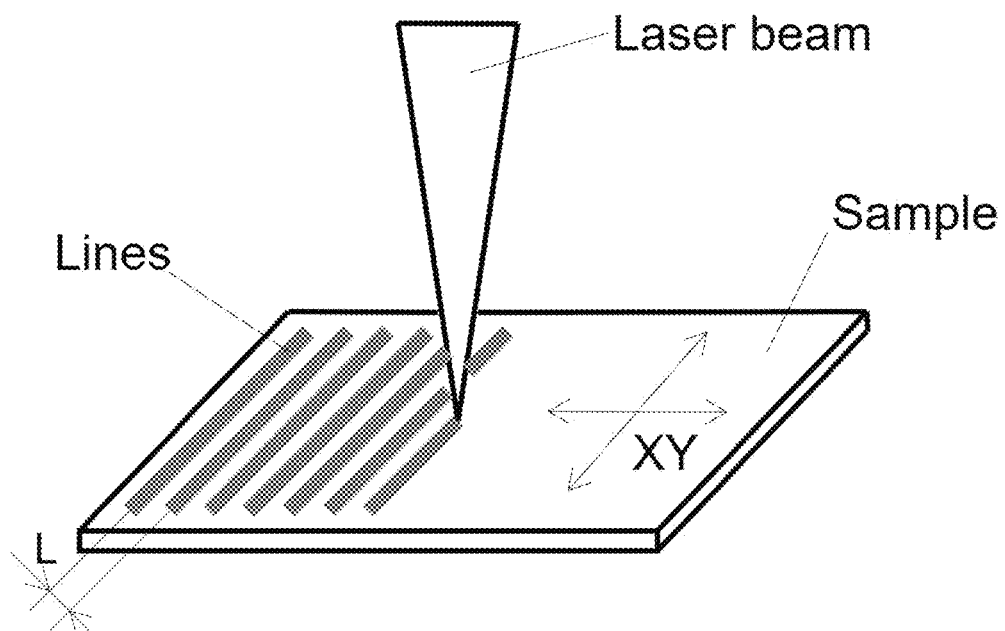
FIG. 4 shows rasterization lines configurations on a sample surface.
Figure 8:
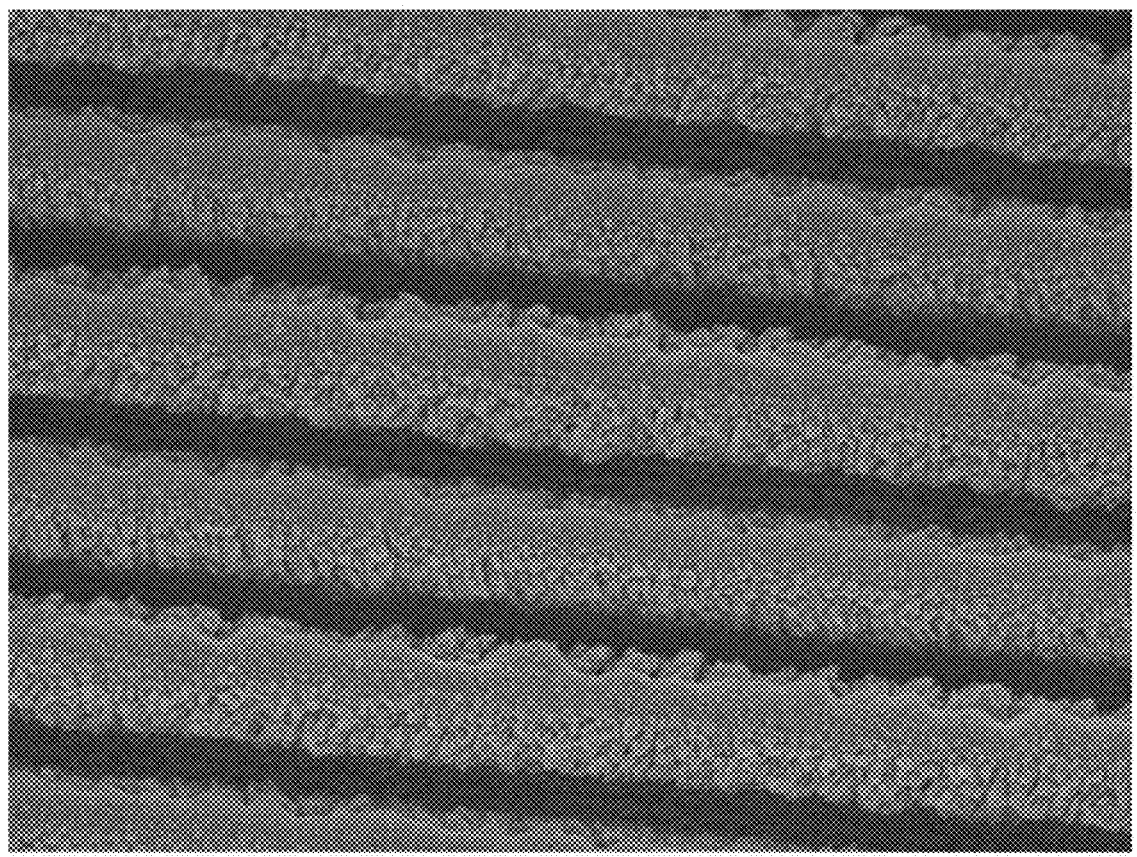
FIG. 8 shows examples of formed lines texture on surface.

Another exemplary embodiment to form different topography on the target material includes the following process steps. The surface of a target material is irradiated using a femtosecond laser system with a predetermined parameters set. The surface is irradiated to form lines (3), trenches, or grooves on the target material surface (2). Such topography is obtained by moving the target material or the laser beam and irradiating the target material surface with a focused laser beam (1) as it is shown in FIG. 4 and resulting in the surface texture shown in FIG. 8.

Figure 5:
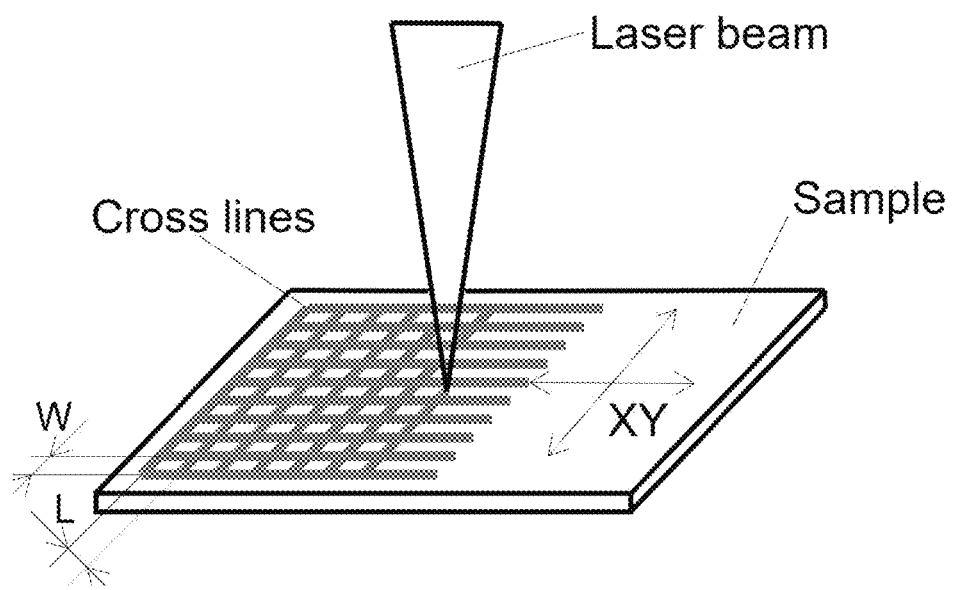
FIG. 5 shows rasterization cross lines configurations on a sample surface.
Figure 9:
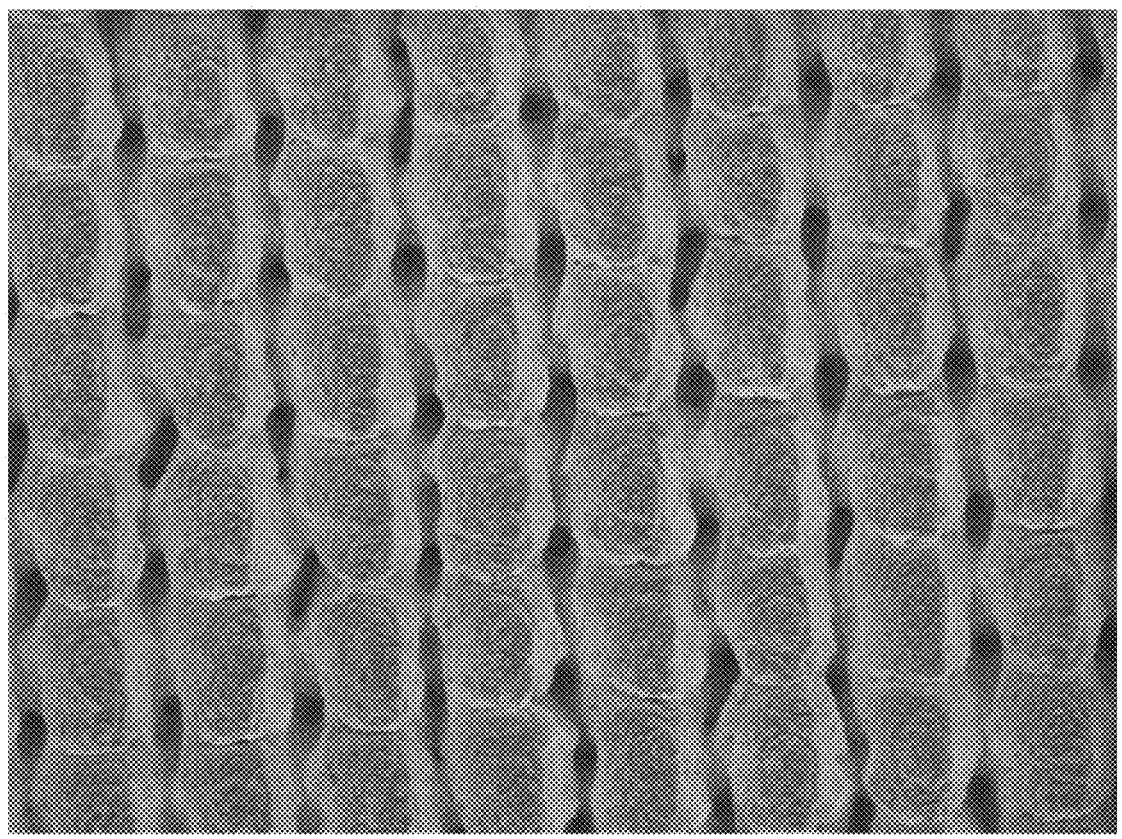
FIG. 9 shows examples of formed crossed lines texture on surface.

Yet another exemplary embodiment to form different topography on the target material includes the following process steps. The surface of a target material is irradiated using a femtosecond laser system with a predetermined parameters set. The surface is irradiated forming cross lines (3), hatches, or pillars on the target material. Such topography is obtained by moving the target material or the laser beam along one axis, irradiating target material surface with a focused laser beam (1), and then similarly irradiating target material surface along another axis as it is shown in FIG. 5 and resulting in the surface texture shown in FIG. 9.

Figure 6:
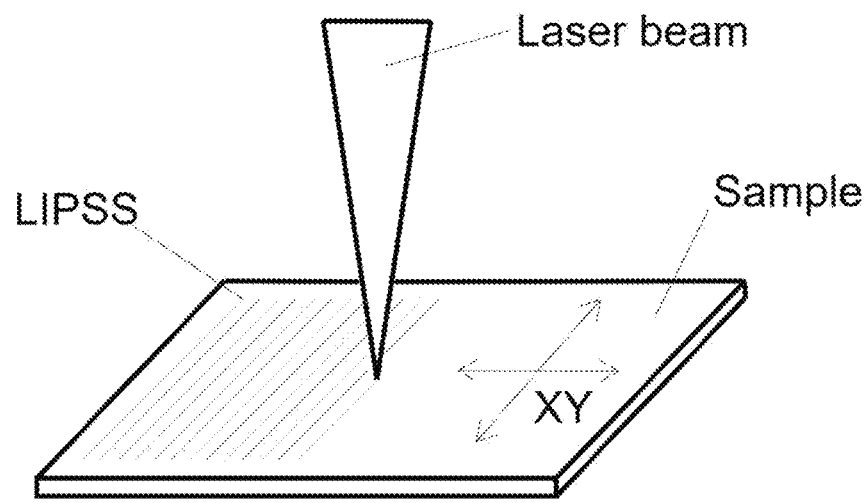
FIG. 6 shows rasterization LIPSS configurations on a sample surface.
Figure 10:
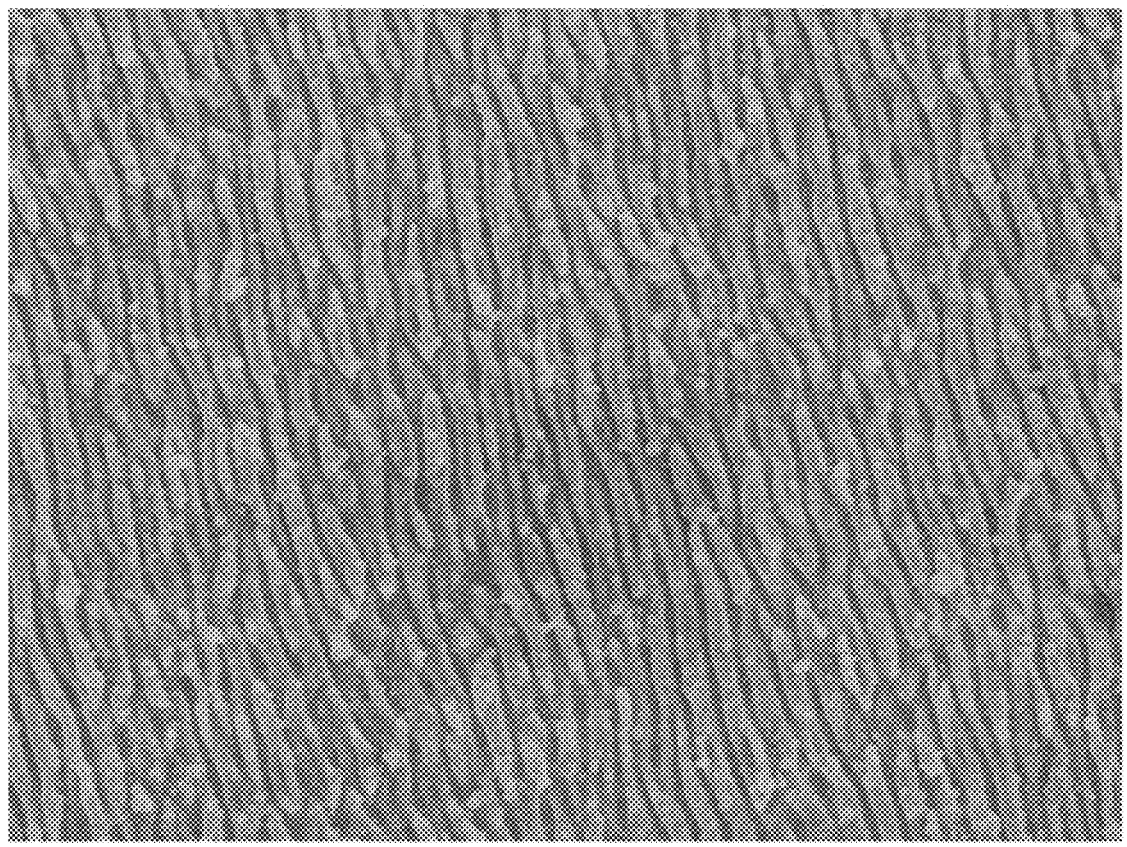
FIG. 10 shows examples of formed LIPSS texture on surface.
Figure 11:
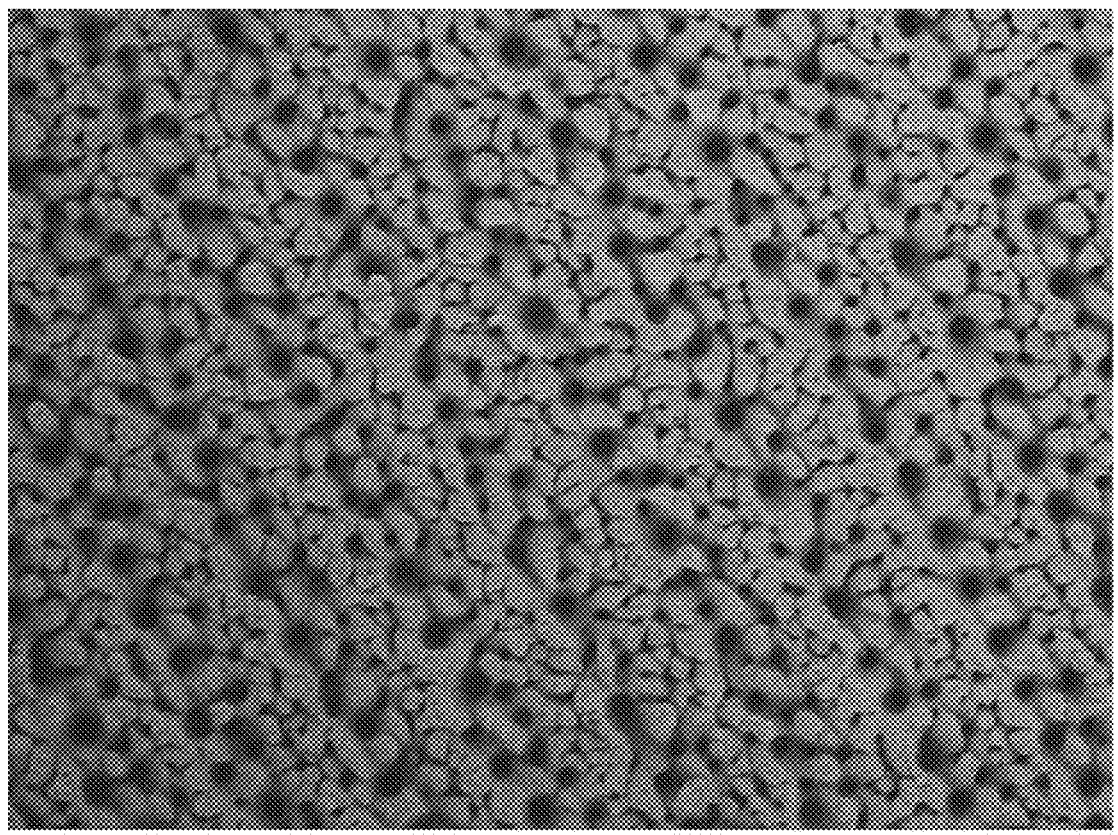
FIG. 11 shows examples of formed texture on surface by irradiating multiple times.
Figure 12:
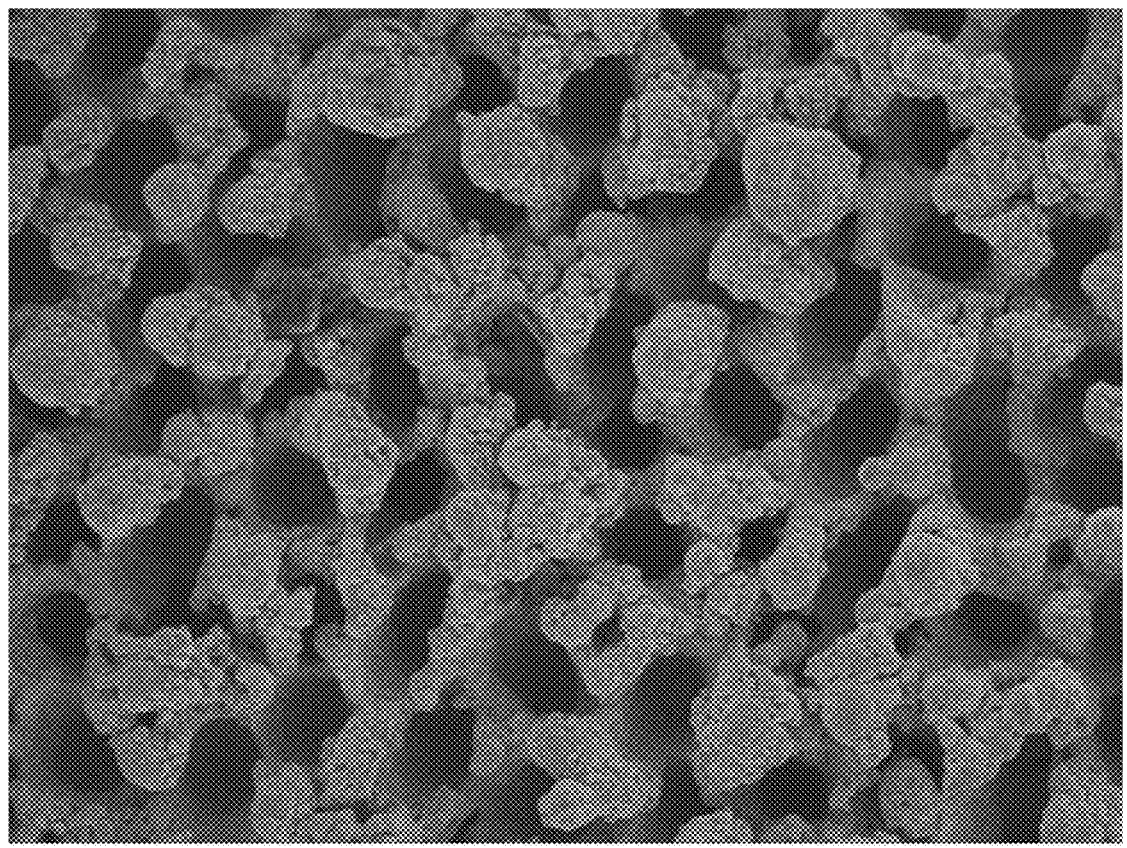
FIG. 12 shows examples of formed chaotic texture on surface.

Still another exemplary embodiment to form different topography on the target material includes the following process steps. The surface of a target material is irradiated using a femtosecond laser system with a predetermined parameters set. The surface is irradiated forming laser-induced periodic surface texture (LIPSS) (3), micro-nano spikes, chaotic (shown in FIG. 12), or other textures on the target material. Such topography is obtained by moving the target material or the laser beam and irradiating the target material surface (2) using ultra-short laser impulses and irradiating with the focused laser beam (1) pathway one or multiple times (example of results shown in FIG. 11) as it is shown in FIG. 6 and resulting in the surface textures shown in FIG. 10.

In another embodiment, a selected topography is formed on the target material surface in controllable gas, vacuum, or liquid environments.

This invention includes the method required to increase target material adhesion properties with a coating material which is described in the most preferred embodiments. This invention has been described in detail using references to certain drawings and embodiments, but it should be understood that modifications and different combinations of parameter sets are within the scope of the claimed invention and will lead to increased adhesion.

The invention claimed is:

1. A method for aluminum surface treatment to achieve increased adhesion with paint, the method comprising:
   analyzing physical and chemical properties of an aluminum material and of a polyurethane coating; wherein the melting and boiling points, thermal capacity, and thermal conductivity are provided by material manufacturer or found in materials catalogs; and wherein the chemical properties of ionization potential, chemical stability, oxidation levels, chemical composition, and reactivity with other chemicals are provided by manufacturer or found in material catalogs;
   measuring roughness of the aluminum material surface with a profilometer;
   removing foreign matter from the aluminum surface by chemical and physical means;
   selecting a dimple pattern based on the chemical and physical properties of the aluminum surface and based on the chemical and physical properties of the polyurethane coating;
   adjusting parameters of a femtosecond laser system, wherein the system is configured to produce a light wavelength between 500 and 1070 nm, and wherein the parameters to be adjusted comprise:
      pulse repetition rate, wherein the pulse repetition rate is within the range of 1 to 50000 kHz;
      average power, wherein the average power is within the range of 0.1 to 300 W;
      polarization;
      pulse duration;
      drilling time;
      scanning speed; and
      focus diameter on the aluminum surface; and
   wherein a required energy output of the femtosecond laser system and the adjusted parameters are configured to produce the selected dimple pattern on the aluminum surface;
   irradiating of the aluminum surface with the set of adjusted parameters for the femtosecond laser system to achieve the selected dimple pattern of the aluminum surface.

2. The method of claim 1, wherein the aluminum surface is aluminum 7050 T7451.

3. The method of claim 2, wherein the chemical and physical means of removing foreign matter from the aluminum surface comprise submerging the aluminum surface in isopropanol and into an ultrasonic bath for 10 minutes.

4. The method of claim 1, wherein the polyurethane coating is MIL-PRF-85285 polyurethane coating.

5. The method of claim 1, wherein the dimple pattern comprises distances between dimple centers of 50 μm in a square orientation.

6. The method of claim 1, wherein the femtosecond laser system produces a 1030 nm light wavelength.

7. The method of claim 1, wherein the laser parameters of the femtosecond laser system are adjusted to produce a linear polarization dimple texture;
   wherein the laser parameters comprise: pulse duration from 900 fs to fs, pulse repetition rate from 50 kHz to 50000 kHz, average power from 2 W to 300 W, irradiation time up to 5 ms, scanning speed up to 0.5 m/s, and focus diameter 35+5 μm.

8. The method of claim 1, wherein the laser parameters of the femtosecond laser system, average power, and pulse repetition rate are adjusted according to melting and boiling points; wherein for a surface having higher melting and boiling points, higher average power and higher pulse repetition rate are used or for a surface having lower melting and boiling points, lower average power and lower pulse repetition rate are used.

9. The method of claim 1, wherein the pulse duration, drilling time, and scanning speed, are adjusted according to the thermal capacity and conductivity.

10. The method of claim 1, wherein the method is performed in one of ambient environmental conditions, oxygen-free conditions, vacuum, inert gas conditions, and liquid environment.

11. The method of claim 1, wherein removal of foreign matter from the aluminum surface by chemical and physical means are determined based on reactivity with other chemicals and chemical stability.

* * * * *